United States Patent
Vanspeybroeck et al.

(10) Patent No.: US 6,211,298 B1
(45) Date of Patent: Apr. 3, 2001

(54) RUBBER MODIFIED MONOVINYLIDENE AROMATIC POLYMER COMPOSITIONS

(75) Inventors: Rony S. Vanspeybroeck, Bellen-Aalter (BE); Mercedes R. Galobardes, Saginaw, MI (US); Dominique Maes, Lochristi (BE); Mary Ann Jones; Joseph M. Ceraso, both of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/404,893

(22) Filed: Sep. 24, 1999

Related U.S. Application Data

(60) Provisional application No. 60/105,377, filed on Oct. 23, 1998.

(51) Int. Cl.[7] .................................................. C08L 33/20
(52) U.S. Cl. ............................ 525/243; 525/71; 525/238
(58) Field of Search ............................... 525/243, 71, 238

(56) References Cited

U.S. PATENT DOCUMENTS 4,419,492 * 12/1983 Simon ..................................... 525/71
4,524,180   6/1985 Bubeck et al. .
4,874,815  10/1989 Sun .

* cited by examiner

*Primary Examiner*—James J. Seidleck
*Assistant Examiner*—Olga Asinovsky

(57) ABSTRACT

The present invention is an improved rubber-modified polymeric composition comprising: (a) a continuous matrix phase comprising an interpolymer of a monovinylidene aromatic monomer and an ethylenically unsaturated nitrile monomer; and (b) from 5 to 40 weight percent, based on the total weight of said polymeric composition, of a rubber in the form of discrete rubber particles dispersed in said matrix, wherein the dispersed rubber particles comprise:

(1) at least 33 weight percent based on the total rubber content, of a mass rubber particle component having a volume average particle diameter of from 0.15 to 0.40 micron;

(2) from 15 to 67 weight percent based on the total rubber content, of a small-particle emulsion rubber component having a volume average diameter of from 0.05 to 0.30 micron; and (3) from 0 to 35 weight percent based on the total rubber content, of a large emulsion particle rubber component having a volume average diameter of from greater than 0.30 to 2.0 micron;

wherein the rubber particles of the composition have an average light absorbance ratio of less than 1.4.

15 Claims, No Drawings

RUBBER MODIFIED MONOVINYLIDENE AROMATIC POLYMER COMPOSITIONS

CROSS REFERENCE STATEMENT

This application claims the benefit of U.S. Provisional Application 60/105,377, filed Oct. 23, 1998.

BACKGROUND OF THE INVENTION

The present invention is related to rubber-modified monovinylidene aromatic polymer compositions.

It is well known in the art that interpolymers of monovinylidene aromatic monomers and ethylenically unsaturated nitrile monomers, such as styrene-acrylonitrile, can be made more impact resistant by the inclusion of elastomeric materials (rubbers) into the matrix or continuous phase of the composition. Typically, the rubber, such as polybutadiene, is in the form of discrete rubber particles having amounts of the matrix interpolymer graft-polymerized to the rubber particles.

It is also well known in the art that the physical properties of these types of compositions are greatly affected by the relative amounts of rubber particles having different sizes and particle structures or morphologies. Larger rubber particles having diameters greater than about 0.5 micron ($\mu$m) generally improve impact resistance, but tend to reduce the gloss. Smaller rubber particles tend to increase gloss but offer less impact resistance. In addition, there is gloss sensitivity to consider, wherein gloss is reduced due to inadequate molding pressure in molding operations.

Additionally, it is known that grafted rubber particles containing occlusions of matrix polymer, provide more impact resistance than the same amount of rubber present as grafted, solid rubber particles. Such grafted, occlusion-containing rubber particles are usually produced in a mass polymerization process. Occlusion-containing particles produced in such mass processes are hereafter referred to as "mass particles".

Solid or non-occluded grafted rubber particles are typically produced by emulsion polymerization of a rubber in the form of an aqueous latex. The non-occluded type of rubber particles, produced via emulsion polymerization process, are hereinafter referred to as "emulsion-particles". When these emulsion particles have been grafted with a different, relatively rigid polymer, but still have a high rubber concentration, i.e. at least about 30 weight percent, these compositions are very suitable for blending with additional amounts of polymer, which may also contain rubber, to achieve a desired rubber content in the resultant composition. Such blendable intermediates are often referred to as "grafted rubber concentrates or "GRC's" and can be used to produce a wide variety of rubber-modified polymer compositions.

Under most circumstances, emulsion polymerization techniques are generally economically feasible only for the production of polymerized rubber particles having volume average diameters of less than about 0.3 micron. Larger particles can be made from these smaller polymerized rubber particles using other specific techniques, such as agglomeration.

Past research has been concentrated on obtaining ABS compositions having optimized physical properties by tailoring the rubber particle distributions (i.e., the sizes and types of rubber particles and the amounts of different size and/or type rubber particles) in the ABS and ABS-type compositions. See, for example, representative U.S. Pat. Nos. 3,509,237; 3,576,910; 3,652,721; 3,663,656; 3,825,621; 3,903,199; 3,903,200; 3,928,494; 3,928,495; 3,931,356; 4,009,226; 4,009,227; 4,017,559; 4,221,883; 4,224,419; 4,233,409; 4,250,271 and 4,277,574; wherein various "bimodal" particle size distributions are disclosed. As used in the art and herein, a composition having a "bimodal" particle size distribution contains two distinct groups of rubber particles, each group having a different average particle size. More recently, there have been disclosed "trimodal" rubber particle size rubber-reinforced polymer compositions wherein the rubber reinforcing ingredient takes the form of three distinct types of rubber particles.

U.S. Pat. No. 4,430,478 to Schmitt et al. and U.S. Pat. No. 4,713,420 to Henton disclose compositions, wherein relatively small and large emulsion rubber particles are used in combination with large mass rubber particles. The resulting "trimodal" compositions are characterized as having good combinations of toughness and gloss. However, Schmitt and Henton use mass rubber particles having a relatively large average particle diameter of at least 0.5 micron. Large mass particles are known to negatively affect the gloss and gloss sensitivity of the final product.

Additionally, U.S. Pat. No. 5,041,498 by Hare et al. discloses a trimodal composition which utilizes relatively small mass particles, i.e. 0.15 to 0.95 $\mu$m. However, Hare's composition is limited to compositions containing less than 30 weight percent mass rubber based on the total weight of the rubber and a maximum of 14 percent rubber in the total composition. As is known in the art, emulsion polymers are more costly to produce than mass polymers, therefore large amounts of emulsion polymers render these compositions economically disadvantaged.

Therefore, there remains a need to develop a more economical ABS-type polymer composition having excellent balance of gloss, gloss sensitivity and impact properties, wherein a high percentage of small rubber particles are obtained from a mass process.

SUMMARY OF THE INVENTION

Accordingly, the present invention is an improved rubber-modified polymeric composition comprising: (a) a continuous matrix phase comprising an inter-polymer of a monovinylidene aromatic monomer and an ethylenically unsaturated nitrile monomer and (b) from 5 to 40 weight percent, based on the total weight of said polymeric composition, of a rubber in the form of discrete rubber particles dispersed in said matrix, wherein the dispersed rubber particles comprise:

(1) at least 33 weight percent based on the total rubber content, of a mass rubber particle component having a volume average particle diameter (Dv) of from 0.15 to 0.40 micron ($\mu$m), (2) from 15 to 67 weight percent based on the total rubber content, of a small-particle emulsion rubber component having a volume average diameter of from 0.05 to 0.30 micron; and (3) from 0 to 35 weight percent based on the total rubber content, of a large emulsion particle rubber component having a volume average diameter of greater than 0.30 to 2.0 microns;

wherein the rubber particles of the composition have an average light absorbance ratio (LAR) of less than 1.4.

We have found that a composition containing a greater amount of small mass particles can have exceptional gloss, impact properties and reduced gloss sensitivity when the mass particles are between 0.15 and 0.40 $\mu$m and the rubber particles of the composition have an average light absorbance ratio of less than 1.4. The composition of the present invention contains a high percentage of small mass rubber particles, allowing for a more economical composition, yet maintains excellent gloss and impact properties. This composition also has improved thermal and color stability when compared to similar compositions with similar gloss and gloss sensitivity properties.

DESCRIPTION OF THE PREFERRED EMBODIMENTS

The composition of the present invention comprises a monovinylidene aromatic/ethylenically unsaturated nitrile interpolymer in a matrix or continuous phase and rubber particles dispersed in the matrix, wherein the rubber particles comprise two or three rubber particle size components.

The matrix or continuous phase of the present invention is an interpolymer comprising polymerized therein a monovinylidene aromatic monomer and an ethylenically unsaturated nitrile monomer. These compositions are generically known as SAN-type or SAN since poly(styrene-acrylonitrile) is the most common example. In general, the matrix portion of the composition comprises at least 50 percent by weight, typically at least 55, preferably at least 60, preferably at least 65, more preferably at least 70, and most preferably at least 80 percent by weight of the interpolymer.

The weight average molecular weight (Mw) of all of the matrix (ungrafted) interpolymer is typically from 50,000, preferably from 100,000, and more preferably from 140,000 to 300,000, preferably to 200,000 and most preferably to 180,000. In a preferred embodiment, no more than 16 weight percent of the matrix polymer has a molecular weight of less than 25,000.

Monovinylidene aromatic monomers include but are not limited to those described in U.S. Pat. Nos. 4,666,987, 4,572,819 and 4,585,825, which are herein incorporated by reference. Preferably, the monomer is of the formula:

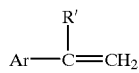

wherein R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Typical monovinylidene aromatic monomers include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof.

Typically, such monovinylidene aromatic monomer will constitute from 50 to 95, preferably from 65 to 85, weight percent of the interpolymer.

Unsaturated nitriles include, but are not limited to, acrylonitrile, methacrylonitrile, fumaronitrile and mixtures thereof. The unsaturated nitrile is generally employed in the matrix interpolymer in an amount of from 5 to 50, preferably from 15 to 35, and more preferably from 20 to 35 weight percent based on the total weight of the monovinylidene aromatic monomer and ethylenically unsaturated nitrile monomer employed in preparing the matrix interpolymer.

Other monomers may also be included in polymerized form in the composition of the present invention, including conjugated 1,3 dienes (e.g. butadiene, isoprene, etc.); alpha- or beta-unsaturated monobasic acids and derivatives thereof (e.g. acrylic acid, methylacrylate, ethylacrylate, butyl acrylate, methacrylic acid and the corresponding esters thereof; vinyl halides such as vinyl chloride, vinyl bromide, etc.; vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, n-phenyl maleimide, etc.; and the like. The amount of such comonomers will generally be less than 10 weight percent based on the total weight of the monomers employed in preparing the non-rubber, polymeric portions of the rubber-reinforced product hereof.

These additional comonomers can be incorporated in to the composition in several ways including, interpolymerization with the monovinylidene aromatic/ethylenically unsaturated nitrile matrix interpolymer, graft polymerization onto the rubber particles, or polymerization into polymeric components which can be combined, e.g. blended with, the composition of the present invention.

The present composition can also contain other polymers and/or copolymers such as polymers and/or copolymers of phenylene oxide, polycarbonates, polyesters and polyester polycarbonates.

The composition of the present invention also comprises a rubber in the form of discrete dispersed rubber particles. The total amount of rubber present in the composition is generally from 5, preferably from 8, more preferably from 10 and most preferably from 12 to 40, preferably to 30, more preferably to 25, and most preferably to 20 weight percent based on the total weight of the composition.

Superstrate polymer grafted to the rubber particles and interpolymer matrix can have the same or different compositions as long as they are compatible. For the purposes of the present invention, an interpolymer in the matrix and a different graft polymer are considered compatible if a blend of the graft polymer with the matrix interpolymer would exhibit good physical properties. Preferentially, a blend of a graft interpolymer with a compatible matrix interpolymer exhibits a single glass transition temperature (Tg) as measured by differential scanning calorimetry (DSC). Preferably, the grafted polymer is an interpolymer compositionally similar to the matrix interpolymer.

The various techniques suitable for producing matrix polymer and the desired grafted (and occluded) polymer are well known in the art. Examples of these known polymerization processes include mass, mass-solution, mass-suspension, suspension and emulsion polymerization processes as well as other modification and/or combinations of such processes. See, for example, U.S. Pat. Nos. 3,509,237; 3,923,494; 4,239,863; 4,243,765; and 4,250,271; which are incorporated herein by reference. As is obvious and well known in the art, the same reaction that is grafting homo- or interpolymer onto one or more of the rubber components can advantageously be used to produce all or part of a corresponding ungrafted homo- or inter polymer for the matrix portion. It should be noted that any production of grafted polymer, in most cases, inherently produces small amounts of ungrafted (i.e. matrix) polymer. Advantageously (1) the small emulsion particles and large emulsion particles are grafted at the same time with monovinylidene aromatic and ethylenically unsaturated nitrile monomers and produce, also at the same time, ungrafted SAN or SAN-type interpolymer; (2) the grafting of the mass particles is done with the same or different monovinylidene aromatic and ethylenically unsaturated nitrile monomers in a different, separate process and also produces ungrafted SAN or SAN-type interpolymer desired for the matrix of the final composition; and (3) the indicated ingredients are then combined to form the subject polymer compositions. Advantageously, the majority of the SAN or SAN-type interpolymer is produced in the mass or mass-solution type polymerization.

The rubber particles dispersed within the matrix interpolymer can comprise three rubber particle components. The term "rubber particle component" means a group of rubber particles of the same rubber particle type and having about the same particle size. The two main rubber particle types are (1) the occluded particles made in a mass-type process and (2) the solid, relatively non-occluded particles made in an emulsion polymerization process. Each rubber component can then be characterized by the combination of the average size of the particles and the process by which they are formed. The average particle size of a rubber particle component, as used herein, will, unless otherwise specified, refer to the volume average diameter. In most cases, the volume average diameter of a group of particles is the same as the weight average. In the case of the emulsion-produced rubber particles, the average particle diameter measurement is typically made before any of the interpolymer is grafted thereto, while in the case of the mass particles, the size generally includes the polymer grafted to the rubber particles and occlusions of polymer within the particles. The volume average diameters of emulsion particle groups and mass particle groups having average particle diameters of less than about 1 micron can be conveniently determined, as can the number average diameters and the particle size distribution, by analysis of transmission electron micrographs or hydrodynamic chromatography (HDC), which is explained in U.S. Pat. No. 3,865,717. In the case of mass and emulsion particles having average particle diameters of more than about 1 micron, the volume average diameter, number average diameter and particle size distribution can be determined by the analysis of transmission electron micrographs of the compositions containing the particles.

Various rubber particle components typically comprise particles having a range of sizes, and do not necessarily consist of particles of only one size. The above analysis techniques indicate, however, that the particles of a particular rubber particle component generally have a fairly narrow range of particle sizes. In other words, the ratio of the volume average particle diameter of a rubber component, to the number average particle diameter of the same rubber component, is generally in the range of from 1 to 3.5. In addition, there is generally an amount of so-called "superstrate" polymer, graft polymerized or grafted onto the rubber particles or substrate. There is also an amount of polymer occluded within the mass particles in addition to the amounts grafted thereto. There may also be some occluded polymer in the emulsion rubber particles, but significantly less than the amount in the mass particles.

The first rubber particle component in the composition of the present invention comprises particles produced from a mass polymerization process having a volume average particle size of from 0.15, typically from 0.18, preferably from 0.20, more preferably from 0.22, and most preferably from 0.24 $\mu$m to 0.40, typically to 0.38, preferably to 0.36, more preferably to 0.34 and most preferably to 0.32 $\mu$m.

It is preferred that the mass rubber particles also have an average light absorbance ratio of less than 2.2, preferably less than 2.0, more preferably less than 1.8, most preferably less than 1.6. The light absorbance ratio (LAR) is the ratio of the light absorbance for a suspension of the rubber particles in dimethylformamide to the light absorbance for a suspension of the rubber particles in dichloromethane, as described in the examples.

It is easily understood that when emulsion rubber particles are present in addition to the mass rubber particles, the average LAR of the rubber particles in the total composition can be different from the average LAR of the mass rubber particles. Typically, the average LAR of the rubber particles in the total composition is less than 1.4, and more preferably less than 1.3.

Suitable rubbers which can be used in a mass process to produce such small particles include a low viscosity rubber having a solution viscosity (5% in styrene at 20° C.) in the range of from 10 to 120 centipose (cps). Suitable rubbers include, but are not limited to, so-called radial or star rubbers, branched rubbers and linear rubbers, all having a cis content of less than 75 percent.

The rubber typically exhibits a second order transition temperature for the diene fragment of not higher than about 0° C., and preferably not higher than about –20° C. Suitable rubbers include alkadienes which include 1,3-conjugated dienes such as butadiene, isoprene, chloroprene or piperylene. Most preferred are homopolymers prepared from 1,3-conjugated dienes, with homopolymers of 1,3-butadiene being especially preferred. Alkadiene copolymer rubbers containing small amounts, for example up to 40 weight percent, of other monomers such as vinyl aromatics can also be employed if the rubbers meet the other qualifications described herein. The rubber can also be a block or tapered block rubber containing up to 40 weight percent styrene.

Polymers having random branching, as well as methods for their preparation, are known in the art and reference is made thereto for the purpose of this invention. Representative branched rubbers and methods for their preparation are described in Great Britain Patent No. 1,130,485 and in *Macromolecules,* Vol. II, No. 5, pg. 8, by R. N. Young and C. J. Fetters.

Radial or star polymers, commonly referred to as polymers having designed branching, are conventionally prepared using a polyfunctional coupling agent or a polyfunctional initiator. Methods for preparing star or radial polymers having designed branching are well-known in the art. Methods for preparing a polymer of butadiene using a coupling agent are illustrated in U.S. Pat. Nos. 4,183,877; 4,340,690; 4,340,691 and 3,668,162, whereas methods for preparing a polymer of butadiene using a polyfunctional initiator are described in U.S. Pat. Nos. 4,182,818; 4,264,749; 3,668,263 and 3,787,510, all of which are herein incorporated by reference. Other star rubbers useful in the composition of the present invention include those taught in U.S. Pat. No. 3,280,084 and U.S. Pat. No. 3,281,383, which are incorporated herein by reference.

Mixtures of the previously mentioned rubbers may also be used to produce the mass particles of the composition of the present invention.

Methods of making such particles in mass processes are well known and exemplified in U.S. Pat. No. 4,239,863, which is incorporated herein by reference, and in EP 277, 687.

It has been found most desirable for this component to use particles resulting from a mass-type or mass-suspension-type grafting process which produces particles having grafted thereto and occluded therein amounts of desired superstrate polymer, preferably SAN or SAN-type polymer.

Such mass processes are disclosed in U.S. Pat. Nos. 3,509, 237 and 4,239,863 which have been incorporated herein by reference.

The mass particles generally constitute at least 33 weight percent, typically at least 35, preferably at least 40, more preferably at least 45, and most preferably at least 50 weight percent, of the total rubber weight in the composition of the present invention.

The second and optional third rubber particle components comprise rubber particles produced from an emulsion polymerization process. Various rubbers can be used to produce the small and large emulsion particles. These rubbers include diene rubbers, polyisoprene rubbers, halogen-containing rubbers and mixtures thereof as well as interpolymers of rubber-forming monomers with other copolymerizable monomers. The preferred rubbers for use in preparing said small and large emulsion particles are diene rubbers or mixtures of diene rubbers, i.e., any rubbery polymers (a polymer having a second order transition temperature not higher than 0° C., preferably not higher than −20° C., as determined by ASTM Test D-746-52T) of one or more conjugated 1,3-dienes, e.g., butadiene, isoprene, piperylene, chloroprene, etc. Such rubbers include homopolymers and interpolymers of conjugated 1,3-dienes with up to equal amount by weight of one or more copolymerizable monoethylenically unsaturated monomers, such as monovinylidene aromatic hydrocarbons (e.g., styrene; a ring-substituted alkylstyrene, such as the o-, m-, and p-vinyl toluene, 2,4-dimethylstyrene, the ring-substituted ethylstyrenes, p-tert-butylstyrene, etc., an alpha-alkylstyrene, such as alpha-methylstyrene, alpha-ethylstyrene, alpha-methyl-p-methylstyrene, etc.; vinyl naphthalene, etc.); ring-substituted halo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.); the corresponding alkyl methacrylates; acrylamides (e.g., acrylamide, methacrylamide, N-butyl acrylamide, etc.); unsaturated ketones (e.g., methyl vinyl ketone, methyl isopropenyl ketone, etc.); alpha-olefins (e.g., ethylene, propylene, etc.); pyridines, vinyl esters (e.g., vinyl acetate, vinyl stearate, etc.); vinyl and vinylidene halides (e.g., the vinyl and vinylidene chlorides and bromides, etc.); and the like.

A preferred group of rubbers for use as the emulsion rubber particles are those consisting essentially of 70 to 100 percent by weight of butadiene and/or isoprene and up to 30 percent by weight of monomer selected from the group consisting of monovinylidene aromatic hydrocarbons (e.g., styrene) and unsaturated nitriles (e.g., acrylonitrile), and acrylates (e.g. methyl methacrylate) or mixtures thereof. Particulars advantageous emulsion rubbery polymer substrates include butadiene homopolymer and interpolymers of 90 to 99 percent by weight butadiene and 1 to 10 percent by weight of acrylonitrile and/or styrene. Preferred rubbers for use as the mass rubber particles include homopolymers of butadiene or isoprene, with butadiene homopolymers being especially preferred.

Various techniques are customarily employed for emulsion polymerizing rubber monomers including Ziegler-Natta, anionic and free radical polymerization. Free radical emulsion polymerization can be used to produce a latex emulsion which is useful as the base for emulsion polymerization of the graft polymer. See, for example, U.S. Pat. No. 4,243,765 which has been incorporated herein by reference.

One of the rubber components in the present invention, hereinafter referred to as the small particle emulsion component, has a relatively small average particle size, the particles thereof having a volume average particle diameter of from 0.05 to 0.30 μm and a number average particle diameter of from 0.013 to 0.30 μm. As discussed above, these small-sized particles are most conveniently prepared by emulsion polymerizing a mixture of rubber-forming monomers to form a dispersion of uniformly sized particles of the desired size, as disclosed in U.S. Pat. Nos. 3,509,237; 3,928,494; 4,243,769; and 4,250,271 which have been incorporated herein by reference. It has been found that this component advantageously has a volume average particle diameter of from 0.08 to 0.20 μm and a number average particle diameter of from 0.02 to 0.13 μm.

The small emulsion particle component is typically from 15, preferably from 20, more preferably from 25 and most preferably from 30 to 67, preferably to 60, more preferably to 55 and most preferably to 50 weight percent of the rubber in the present invention.

It is usually desirable, in grafting polymer onto the particles of this small rubber particle component, to achieve a graft-to-rubber weight ratio of at least about 0.3 and preferably from about 0.3 to about 2 in order to achieve desired gloss and impact resistance in the resultant ABS or ABS-type product. Graft-to-rubber weight ratio can be determined by extracting the polymer with an excess of a non-rubber solvent, separating the phases by centrifugation, and determining their dry weights. The weight of the graft is the portion of the insoluble phase that is not rubber.

The optional larger emulsion particle rubber component has a volume average particle diameter of from greater than 0.30, preferably from 0.4, more preferably from 0.5 to 2.0 μm, preferably to 1.5, more preferably 1.0, and most preferably to 0.9 μm.

This larger emulsion particle rubber component is typically from 0, preferably from 5, more preferably from 8 and most preferably from 10 to 35, preferably to 30, and more preferably to 27 weight percent, based on the total weight of the rubber in the composition.

Since most emulsion polymerization processes do not inherently produce particles in the aforementioned large emulsion particle size range, the particles of this component can be produced by agglomerating or coagulating emulsion-produced dispersion of smaller rubber particles, either before, during or after the particles are grafted. See, for example, U.S. Pat. Nos. 3,551,370; 3,666,704; 3,956,218; and 3,825,621 which have been incorporated herein by reference.

It is usually desirable to graft enough polymer onto the particles of this large emulsion rubber particle component to achieve a graft-to-rubber ratio of at least about 0.05 in order to balance gloss and impact properties in the resultant ABS or ABS-type composition. Preferably, the graft-to-rubber ratio for this component will be from 0.05 to 0.65, especially from 0.08 to 0.50.

In instances where small and large emulsion rubber particles are present in the same composition, they are typically employed in a weight ratio of the former to the latter of from 67 to 1, preferably from 20 to 1, and most preferably from 10 to 1, and most preferably from 5 to 1.

In a preferred embodiment, a low molecular weight additive having a surface tension of less than 30 dynes/cm (ASTM D1331, 25° C.) is also included in the composition of the present invention. In particular, a low molecular weight silicone oil is used to improve impact properties as described in U.S. Pat. No. 3,046,239 and U.S. Pat. No. 3,703,491, which are herein incorporated by reference. Preferably, the silicone oil is polydimethylsiloxane having a viscosity of from 5 to 1000 centipoise, preferably from 25 to 500 centipoise. The composition typically contains from 0.01 to 2.0 weight percent, based on the total weight of the composition, of the polydimethylsiloxane, preferably from 0.1 to 1.0 weight percent. The effect of such silicone oils is enhanced by the incorporation of other additives such as wax and tallow, wherein each is also incorporated at a level of from 0.5 to 1.5 weight percent, based on the total weight of the composition. Alternatively, fluorinated compounds such as a perfluoropolyether or a tetrafluoroethylene polymer can be used as the low molecular weight additive. Mixtures of such additives can also be used.

The composition of the present invention is useful in a variety of applications including household appliances, toys, automotive parts, extruded pipe, profiles and sheet for sanitary applications.

The following examples are provided to illustrate the present invention. The examples are not intended to limit the scope of the present invention and they should not be so interpreted. Amounts are in weight percentages unless otherwise indicated.

Various standard test methods are used to evaluate the physical properties of the various following constituents and example compositions.

Melt flow rates (MFR) are determined according to ISO 1133 on a Zwick 4105 01/03 apparatus. The condition prior to testing is 2 hours at 80° C. The test conditions for melt flow rate measurement are a temperature of 220° C. and a load of 10 kg.

The notched Izod impact strength (Izod) values are determined on specimens prepared from molded samples according to ISO 180/1A at 23° C.

Gardner gloss values are determined on specimens prepared from molded samples, 30 minutes after molding, according to ISO 2813 with "Dr. Lange RB3" reflectometer (20° and 60° angle).

Yellowness index values are determined according to ASTM E313 With Data Color 3890 apparatus (Illuminant D65/Observer 10°/Diafragma=27)

Following equipment and procedure are used to prepare molded samples:

Molded samples required for Izod and for yellowness index measurements are injection molded on a DEMAG injection molding machine model D 150-452. Following are the applied molding conditions:

TABLE 1

| Molding conditions | |
|---|---|
| Temperatures (° C.) | |
| Barrel zones 1/2/3 | 220/230/240 |
| Nozzle zone | 250 |
| Hot runner tip | 245 |
| Mould fixed side/moving side | 50/50 |
| Pressures (bar) | |
| Injection pressure | 70 |
| Holding pressures 1/2/3 | 60/50/35 |
| Back pressure | 5 |
| Times (seconds) | |
| Injection time set | 10 |
| Follow up pressure 1/2/3 | 5/4/2 |
| Cooling time (seconds) | 20 |
| Injection speed (cm³/s) | 18 |

Molded samples for Gardner gloss measurements are injection molded on an Arburg 170 CMD all-rounder injection molding machine into an plaque mold.

Two different injection molding conditions are applied, referred to as "top gloss" conditions and "bottom gloss" conditions. These conditions are favorable and unfavorable, respectively for the gloss of the resulting molded plaque. The gloss difference of the molded plaques is an indication of the gloss sensitivity of the material to molding conditions. Key differences between the two conditions are polymer mass temperature, mould temperature and cavity pressure in the mold. During injection molding, the injection pressure switches to holding pressure when the cavity pressure reaches the pre-set value. By using a constant pre-set cavity pressure value, the weight of the molded plaques is the same for materials with different melt flow.

The dimensions of the molded plaque are 64.2 mm×30.3 mm×2.6 mm. Gloss is measured in the center of the plaque on the surface at which the pressure is measured. The materials are injected through one injected point located in the middle of the short side of the mold. The pressure transducer is located at a distance of 19.2 mm from the injection point.

The polishing of the mold is according to SPI-SPE1 standard of the Society of Plastic Engineers.

TABLE 2

| | Molding conditions | |
|---|---|---|
| | "Top gloss" | "Bottom gloss" |
| Mass temperature (° C.) | | |
| Nozzle zone | 250 | 225 |
| Barrel zone 1 | 245 | 220 |
| Barrel zone 2 | 240 | 215 |
| Rear zone | 235 | 210 |
| Mould temperature (° C.) | 50 | 30 |
| Holding pressure (bar)/ Time periods (seconds) | | |
| (1) | 400/0.8 | 50/0.8 |
| (2) | 300/0.8 | 50/0.8 |
| (3) | 200/0.8 | 50/0.8 |
| (4) | 50/0.8 | 50/0.8 |
| (5) | 50/0.8 | 50/0.8 |
| (6) | 50/2 | 50/2 |
| Cooling time (seconds) | 20 | 30 |
| Injection pressure (bar) | 1300 | 1500 |
| Cavity switch pressure (bar) | 650 | 200 |
| Injection speed (cm³/s) | 10 | 10 |

Image analysis of transmission electron micro-graphs (TEM) is applied to characterize the rubbers. Following is a description of the applied method:

Melt flow rate strands are produced by means of an extrusion plastometer at 220° C. and 10 kg load. A sample is cut to fit a microtome chuck. The area for microtomy is trimmed to approximately 1 mm² and stained in $OsO_4$ vapor overnight at 24° C. Ultrathin sections are prepared using standard microtomy techniques. 70 nanometer thin sections are collected on Cu grids and are studied in a Philips CM12 Transmission Electron microscope at 120 KV. The resulting micrographs are analyzed for rubber particle size distribution and rubber phase volume by means of a Leica Quantimet Q600 image analyzer. Images are scanned with a resolution of 0.005 micron/pixel in auto contrast mode in which the white level is adjusted first to give full-scale output on the whitest part of the image then black level is adjusted to give zero output on the darkest part of the image. Unwanted artifacts in the background are removed by a smooth white morphological transform. The rubber particles are divided based on their morphological properties in three classes. Particles with an area smaller than 0.0625 $\mu m^2$ are assigned to small emulsion rubber, the mass rubber particles are filtered manually based on the presence of large occlusions and their smooth perimeter. The remaining particles are assigned to large emulsion rubber. From each class the area of individual and the total area of rubber particles are measured.

Rubber phase volume $\Phi$ in rubber reinforced styrenic resins was previously estimated by measuring gel content. Improved resins containing such small rubber particles render this method no longer feasible. $\Phi$ can be derived directly from TEM micrographs, assuming that the observed rubber phase area fraction S equals $\Phi$. This approach overestimates $\Phi$, due to section thickness effects. Such effects gain importance with increasing section thickness t and/or decreasing particle size of the rubber. A steriological correction of S allows to calculate $\Phi$ within sizeable error margins $$\kappa = \frac{2D_p}{3t + 2D_p}$$

The projected average diameter $D_p$ is calculated from the results obtained from a particle size distribution measurement after correction for section thickness.

$$D_p = \frac{\sum_{i=1}^{m} N_i \cdot d_i^3}{\sum_{i=1}^{m} N_i \cdot d_i^2}$$

where $N_i$: number of particles in class i after correction.
$d_i$: maximum diameter of class i.
m: total number of classes.

Errors in $\Phi$ are found to be mainly due to an inhomogeneous distribution of the rubber. Also the sectioning causes from about 1 to 2%, of the mass ABS to be counted as small emulsion ABS.

However, the micrographs also show particles which are not cut through the middle. A correction method developed by Scheil (E. Scheil, Z. Anorg. Allgem. Chem. 201, 259 (1931); E. Scheil, Z. Mellkunde 27(9), 199 (1935); E. Scheil, Z. Mellkunde 28(11), 240 (1936)) and Schwartz (H. A. Schwartz, Metals and Alloys 5(6), 139 (1934)) is slightly modified to take the section thickness into account. The measured area of each rubber particle ($a_i$) is used to calculate the equivalent circle diameter $n_i$: this is the diameter of a circle having the same area as the rubber particle. The distribution of $n_i$ is divided into discrete size groups of 0.05 micron $d_i$ from 0 to 1 micron.

$$N_i = \frac{n_i + \sum_{j=i+1}^{m} N_j \sqrt{d_j^2 - d_i^2} - \sqrt{d_j^2 - d_{i-1}^2}}{t + \sqrt{d_i^2 - d_{i-1}^2}}$$

where $n_i$: number of particles in class □ before correction

Once Ni versus $d_i$ is obtained, the following parameters are calculated:

$$\text{Number average diameter} \quad D_n = \frac{\sum_{i=1}^{m} N_i \cdot \delta_i}{N}$$

$$\text{Area average diameter} \quad D_a = \sqrt{\frac{\sum_{i=1}^{m} N_i \cdot \delta_i^2}{N}}$$

$$\text{Volume average diameter} \quad D_v = \sqrt[3]{\frac{\sum_{i=1}^{m} N_i \cdot \delta_i^3}{N}}$$

$$Z+1 \text{ average diameter} \quad D_{z+1} = \frac{\sum_{i=1}^{m} N_i \cdot d_i^4}{\sum_{i=1}^{m} N_i \cdot d_i^3}$$

$$\text{Projection average diameter} \quad D_p = \frac{\sum_{i=1}^{m} N_i \cdot d_i^3}{\sum_{i=1}^{m} N_i \cdot d_i^2}$$

$$\text{Dispersity factor 1} \quad D_1 = \frac{D_v}{D_n}$$

$$\text{Dispersity factor 2} \quad D_2 = \frac{D_{z+1}}{D_n}$$

Weight average and number average molecular weights are determined using gel permeation chromatography (GPC).

Rubber cross-linking is quantified by the light absorbance ratio (LAR) as determined by the method described below:

1. Principle

Rubber particles from HIPS or ABS samples are suspended in dimethylformamide (DMF) and dichloromethane. The particles suspended in DMF swell slightly, whereas the particles suspended in dichloromethane swell as far as their crosslinking will allow. When light is passed through these two suspensions light absorbance is less for the dichloromethane suspension than it is for the DMF suspension. The level of rubber cross-linking can be quantified by dividing the light absorbance reading from the DMF suspension by that of the dichloromethane suspension. This light absorbance ratio (LAR) is listed in Tables 1–6.

The general procedure steps consist of:

1) Weigh 0.40 g of sample into a vial, and add 40.0 mL of dimethylformamide. Close the vial and shake until the polymer matrix is completely dissolved.
2) Measure 40.0 mL of dimethylformamide into a second vial.
3) Measure 20.0 mL of dichloromethane into a third vial.
4) Take two 5.0-mL aliquots of solution (step 1) and add these to the solvents measured in steps (2) and (3). Close the vials and shake for about 30 seconds by hand.
5) Repeat steps 1–4 for all samples concerned.
6) Use a Probe calorimeter, equipped with a 450 nm wavelength filter, Brinkmann model PC 800, or equivalent, from Brinkmann Instruments Inc., Westbury, N.Y., USA.
7) Place the probe in clean DMF, and agitate to remove any air bubbles.
8) Without moving the probe, set the absorbance to zero.
9) Remove the probe and air dry.

10) Determine the absorbencies of the DMF solutions as prepared. Between each measurement rinse the probe with DMF and dry with air. Check the zero absorbance with clean DMF at least every fourth measurement.
11) Repeat steps 7–9 when all the DMF solutions have been analyzed.
12) Determine the absorbencies of the dichloromethane solutions as prepared. Between each measurement rinse the probe with dichloromethane and dry with air. Check the zero absorbance with clean DMF at least after every fourth measurement.
13) Calculate the LAR using the following equation:

$$LAR = \frac{(\text{Absorbance of Sample in DMF})}{(\text{Absorbance of Sample in Dichloromethane})}$$

EXAMPLES

Mass particles are produced as described in U.S. Pat. No. 4,239,863, herein incorporated by reference.

TABLE 3

Mass Rubber particles

| | Composition | | | | | | Rubber | | | | SAN Molecular weight | |
| | | | | | | | Particle size | | Volume | Cross- | | |
| No. | rubber % | AN/SAN % | PBD % | AN % | STY % | Type* | $D_n^{(1)}$ μm | $D_v^{(2)}$ μm | $\Phi^{(3)}$ % | linking $LAR^{(4)}$ | $M_w^{(5)}$ Kg/mol | $M_n^{(6)}$ |
|---|---|---|---|---|---|---|---|---|---|---|---|---|
| M-1** | 7.0 | 28.3 | 7.0 | 26.3 | 66.7 | MR-1 | 0.40 | 0.45 | 16.0 | 2.03 | 166 | 59 |
| M-2 | 7.3 | 27.9 | 7.3 | 25.9 | 66.8 | MR-2 | 0.25 | 0.30 | 13.8 | 1.43 | 153 | 44 |
| M-3 | 9.3 | 28.8 | 9.3 | 26.1 | 64.6 | MR-2 | 0.30 | 0.34 | 13.0 | 1.33 | 179 | 44 |
| M-4 | 11.1 | 27.8 | 7.8 | 25.6 | 66.6 | MR-3 | 0.23 | 0.25 | 10.9 | 1.38 | 171 | 45 |
| M-5 | 11.7 | 27.9 | 8.2 | 25.6 | 66.2 | MR-3 | 0.23 | 0.25 | 11.6 | 2.43 | 176 | 44 |
| M-6 | 7.7 | 28.3 | 7.3 | 26.2 | 66.5 | MR-4 | 0.25 | 0.28 | 10.8 | 1.30 | 174 | 45 |
| M-7 | 8.3 | 28.2 | 7.9 | 26.0 | 66.1 | MR-4 | 0.22 | 0.24 | 8.9 | 2.42 | 163 | 45 |
| M-8 | 14.0 | 22.3 | 12.5 | 19.5 | 68.0 | MR-5 | 0.27 | 0.30 | 19.0 | 1.43 | 161 | 46 |

*Rubber types:
MR-1: Diene 55 brand rubber available from Firestone
MR-2: Buna CB HX565 brand rubber available from Bayer (Anionically polymerized polybutadiene, coupled with tetrafunctional component to star-branched structure, and having a 5% solution viscosity in styrene of 45 cPoise)
MR-3: Solprene ™ 1322 brand rubber available from Industries Negromex (Anionically polymerized styrene (30) - butadiene (70) block rubber having a 5% solution viscosity in styrene of 30 cPoise)
MR-4: Anionically polymerized styrene (5) - butadiene (95) block rubber coupled with tetrafunctional component to star-branched structure, having a 5% solution viscosity in styrene of 20 cPoise
MR-5: 11% of MR-4 + 3% of MR-3
PDB = polybutadiene
AN = acrylonitrile
SAN = styrene-acrylonitrile copolymer
STY = styrene
**M-1 is a comparative example that is not part of the invention
[1]Number average rubber particle size determined by transmission electron microscopy
[2]Volume average rubber particle size determined by transmission electron microscopy
[3]Rubber phase volume determined by transmission electron microscopy
[4]Absorbance ratio: ratio of the light absorbance from a suspension in DMF and a suspension in dichloromethane
[5]Weight average molecular weight determined by gel permeation chromatography
[6]Number average molecular weight determined by gel permeation chromatography

TABLE 4

Emulsion Rubber particles

| | Composition | | | | | | Rubber | | | | SAN Molecular weight | |
| | | | | | | | Particle size | | Volume | Cross- | | |
| No. | Rubber % | AN/SAN % | PBD % | AN % | STY % | Type* | $D_n^{(1)}$ μm | $D_v^{(2)}$ μm | $\Phi^{(3)}$ % | linking $LAR^{(4)}$ | $M_w^{(5)}$ Kg/mol | $M_n^{(6)}$ |
|---|---|---|---|---|---|---|---|---|---|---|---|---|
| E-1 | 54 | 28 | 50 | 14 | 36 | ER-1 | 0.15 | 0.15 | 43 | 1.22 | 97 | 45 |
| | | | | | | ER-2 | 0.30 | 0.34 | 10 | | | |
| E-2 | 35 | 29 | 35 | 19 | 46 | ER-3 | 0.20 | 0.23 | 49 | 1.17 | 123 | 50 |

*Rubber types:
E-1: Emulsion polymerized ABS consisting of a bimodal rubber particle size-containing composition wherein the emulsion rubber particles ER-1 and ER-2 are a 93:7 weight ratio butadiene/styrene copolymer rubber, the small emulsion rubber particles have a volume average diameter of about 0.15 micron and the large emulsion particles have a volume average diameter of about 0.35 micron, the total emulsion rubber content is about 52 weight percent, the graft-to-rubber weight ratio is about 0.55 and the weight ratio of small to large rubber particles is about 80:20. The matrix of said bimodal emulsion ABS composition constitutes about 25 weight percent thereof and is composed of a SAN copolymer having a STY:AN weight ratio of about 72:28 and a weight average molecular weight of about 100,000 g/mol.
E-2: Ronfalin TZ 220 available from DSM; Emulsion polymerized ABS with monomodal rubber particle size.

E-1: Emulsion polymerized ABS consisting of a bimodal rubber particle size-containing composition wherein the emulsion rubber particles ER-1 and ER-2 are a 93:7 weight ratio butadiene/styrene copolymer rubber, the small emulsion rubber particles have a volume average diameter of about 0.15 micron and the large emulsion particles have a volume average diameter of about 0.35 micron, the total emulsion rubber content is about 52 weight percent, the graft-to-rubber weight ratio is about 0.55 and the weight ratio of small to large rubber particles is about 80:20. The matrix of said bimodal emulsion ABS composition constitutes about 25 weight percent thereof and is composed of a SAN copolymer having a STY:AN weight ratio of about 72:28 and a weight average molecular weight of about 100,000 g/mol.

E-2: Ronfalin TZ 220 available from DSM; Emulsion polymerized ABS with monomodal rubber particle size.

The following examples are prepared by melt blending wherein preblends of all components, including additives, are thoroughly mixed and fed to a Buss MDK-46 Ko-Kneader compounder with temperature settings at 180, 200, 240 and 200° C. at the die.

TABLE 5

| | | | Ex. 1 | Ex. 2 | Ex. 3 | Ex. 4 | Ex. 5 | Ex. 6 | Ex. 7 | Ex. 8 | Comp. 1 |
|---|---|---|---|---|---|---|---|---|---|---|---|
| Composition | | | | | | | | | | | |
| E-1 | | wt. % | 17 | 0 | 7 | 12 | 0 | 16.5 | 16.5 | 17 | 19 |
| E-2 | | wt. % | 0 | 23 | 0 | 0 | 17 | 0 | 0 | 0 | 0 |
| SAN 125 [7] | | wt. % | 0 | 0 | 0 | 0 | 0 | 0 | 0 | 0 | 46 |
| M-1 | | wt. % | 0 | 0 | 0 | 0 | 0 | 0 | 0 | 0 | 33 |
| M-2 | | wt. % | 80.75 | 74.75 | 0 | 0 | 0 | 0 | 0 | 80.975 | 0 |
| M-8 | | wt. % | 0 | 0 | 90.80 | 85.80 | 80.80 | 0 | 0 | 0 | 0 |
| M-6 | | wt. % | 0 | 0 | 0 | 0 | 0 | 81.25 | 0 | 0 | 0 |
| M-4 | | wt. % | 0 | 0 | 0 | 0 | 0 | 0 | 81.25 | 0 | 0 |
| Acrawax C [8] | | wt. % | 1 | 1 | 1 | 1 | 1 | 1 | 1 | 1 | 1 |
| Edenor NHTI [9] | | wt. % | 1 | 1 | 1 | 1 | 1 | 1 | 1 | 1 | 1 |
| PDMS DC200 (50 cSt.) [10] | | wt. % | 0.25 | 0.25 | 0.2 | 0.2 | 0.2 | 0.25 | 0.25 | 0 | 0 |
| Galden HT 270 [11] | | wt. % | 0 | 0 | 0 | 0 | 0 | 0 | 0 | 0.025 | 0 |
| Rubber composition | | | | | | | | | | | |
| Mass rubber | | wt. % | 5.8 | 5.4 | 11.3 | 10.7 | 10.1 | 6.5 | 6.3 | 5.8 | 2.5 |
| Small emulsion rubber | | wt. % | 7.2 | 9.2 | 2.9 | 5.0 | 6.8 | 6.9 | 6.9 | 7.0 | 7.9 |
| Large emulsion rubber | | wt. % | 1.6 | 0 | 0.7 | 1.2 | 0 | 1.7 | 1.7 | 1.8 | 2.0 |
| Total | | wt. % | 14.7 | 14.6 | 15.0 | 17.0 | 16.9 | 15.1 | 14.9 | 14.7 | 12.4 |
| mass/total rubber | | wt. % | 40 | 37 | 76 | 63 | 60 | 43 | 43 | 40 | 20 |
| Small emulsion/total rubber | | wt. % | 49 | 63 | 19 | 30 | 40 | 46 | 46 | 48 | 64 |
| Large emulsion/total rubber | | wt. % | 11 | 0 | 5 | 7 | 0 | 11 | 11 | 12 | 16 |
| Morphology | | | | | | | | | | | |
| rubber particle size (Dv) | Small emulsion | um | 0.15 | 0.23 | 0.15 | 0.15 | 0.23 | 0.15 | 0.15 | 0.15 | 0.15 |
| | Large emulsion | um | 0.34 | — | 0.34 | 0.34 | — | 0.34 | 0.34 | 0.34 | 0.34 |
| | Mass ABS | um | 0.3 | 0.3 | 0.3 | 0.3 | 0.3 | 0.28 | 0.24 | 0.3 | 0.45 |
| Characterization | | | | | | | | | | | |
| LAR | | | 1.22 | 1.26 | 1.39 | 1.35 | 1.28 | 1.20 | 1.21 | 1.22 | 1.36 |
| Mw | | kg/mole | 153 | 146 | 152 | 156 | 157 | 163 | 160 | 153 | 122 |
| D (Mw/Mn) | | | 3.4 | 3.3 | 3.4 | 3.4 | 3.4 | 3.6 | 3.6 | 3.4 | 2.3 |
| PBD content | | wt. % | 16.5 | 18.7 | 15.9 | 17.9 | 19.3 | 16.7 | 15.9 | 16.4 | 14.3 |
| AN content | | wt. % | 26.3 | 26.8 | 21.4 | 21 | 22 | 26.7 | 26.2 | 26 | 28.4 |
| STY content | | wt. | 57.2 | 54.5 | 62.7 | 61.1 | 58.7 | 56.6 | 57.9 | 57.6 | 57.3 |
| AN/SAN | | wt. | 31 | 33 | 25 | 26 | 27 | 32 | 31 | 31 | 33 |
| Rubber volume fraction Φ | Mass | vol. % | 10.1 | 9.0 | 16.8 | 16.1 | 13.6 | 7 | 9.8 | 10.1 | 5.3 |
| | Small emulsion | vol. % | 8.4 | 12.2 | 6.1 | 6.6 | 9.4 | 8.1 | 8.9 | 8.4 | 9.1 |
| | Large emulsion | vol % | 2.1 | 0 | 1.8 | 1.5 | 0 | 2.4 | 2.4 | 2.2 | 2.7 |
| | Total | vol % | 20.6 | 21.2 | 24.7 | 24.2 | 23.0 | 18 | 21.1 | 20.6 | 17.1 |
| mass/total rubber | | vol % | 49 | 42 | 68 | 66 | 59 | 40 | 42 | 49 | 31 |
| small emulsion/total | | vol % | 41 | 58 | 25 | 28 | 41 | 46 | 47 | 41 | 53 |
| large emulsion/total | | vol % | 10 | 0 | 7 | 6 | 0 | 14 | 11 | 10 | 16 |
| Properties | | | | | | | | | | | |
| MFR (melt flow rate) | 220° C./10 kg | g/10' | 16.2 | 19.7 | 16.1 | 16.5 | 14.3 | 21.2 | 15.9 | 18.7 | 25.4 |
| Izod | 2.75 J | KJ/m$^2$ | 27.6 | 22.6 | 21.7 | 22.7 | 20.7 | 20.7 | 20.5 | 28.1 | 21.3 |
| Gloss (bottom) | 20° | % | 31 | 23 | 35 | 36 | 36 | 36 | 35 | 37 | 18 |
| | 60° | % | 79 | 77 | 80 | 81 | 82 | 82 | 80 | 81 | 71 |
| Gloss (top) | 20° | % | 80 | 76 | 82 | 83 | 83 | 83 | 82 | 81 | 72 |
| | 60° | % | 95 | 93 | 96 | 96 | 96 | 96 | 95 | 95 | 93 |

[7]: SAN 125 is available from Dow Chemical
[8]: N,N' ethylenebisstearamide wax available from Lonza
[9]: Refined & hydrogenated tallow glyceride available from Henkel
[10]: polydimethylsiloxane available from Dow Corning
[11]: perfluoropolyether available from Ausimont The examples of the present invention have a better gloss and equal or better impact strength properties than Comp. 1. Comp. 1 has a lower mass rubber particle content and mass particles of larger size compared to the examples of the invention.

TABLE 6

| | | Ex. 9 | Comp. 2 |
|---|---|---|---|
| Composition | | | |
| E-1 | wt. % | 19 | 15 |
| SAN 125 [7] | wt. % | | 27 |
| M-1 | wt. % | | 56 |
| M-3 | wt. % | 78.75 | 0 |
| Acrawax C [8] | wt. % | 1 | 1 |
| Edenor NHTI [9] | wt. % | 1 | 1 |
| PDMS DC200 (50 cSt.) [10] | wt. % | 0.25 | 0 |
| Rubber composition | wt. % | | |
| mass rubber | wt. % | 7.1 | 4.3 |
| Small emulsion rubber | wt. % | 7.9 | 6.2 |
| Large emulsion rubber | wt. % | 2.0 | 1.6 |
| Total | wt. % | 17.0 | 12.1 |
| Mass/total rubber | wt. % | 42 | 35 |
| Small emulsion/total rubber | wt. % | 46 | 51 |
| Large emulsion/total rubber | wt. % | 12 | 13 |
| Morphology | | | |
| Rubber particle size (Dv) Small emulsion | Um | 0.15 | 0.15 |
| Large emulsion | Um | 0.34 | 0.34 |
| Mass ABS | Um | 0.34 | 0.45 |
| Characterization | | | |
| LAR | | 1.22 | 1.47 |
| Mw | kg/mole | 167 | 139 |
| D (Mw/Mn) | | 3.8 | 2.4 |
| PBD content | wt. | 19.8 | 14.1 |
| AN content | wt. | 27.5 | 27.5 |
| STY content | wt. | 52.7 | 58.4 |
| AN/SAN | wt. | 34.3 | 32.0 |
| Rubber volume fraction Φ Mass | vol. % | 12.9 | 8.5 |
| Small emulsion | vol. % | 8.4 | 7.7 |
| Large emulsion | vol. % | 1.8 | 2.3 |
| Total | vol. % | 23.1 | 18.5 |
| mass/total rubber | vol. % | 56 | 46 |
| Small emulsion/total rubber | vol. % | 36 | 42 |
| Large emulsion/total rubber | vol. % | 8 | 12 |
| Properties | | | |
| MFR | 220° C./10 kg | g/10¹ | 15.2 | 15.7 |
| Izod | 2.75 J | KJ/m2 | 28.5 | 28.0 |
| Gloss (bottom) | 20 ° | % | 30 | 8 |
| | 60 ° | % | 77 | 60 |
| Gloss (top) | 20 ° | % | 77 | 66 |
| | 60 ° | % | 94 | 91 |

Comp. 2 has a higher mass rubber content than Comp. 1 (Table 5), and demonstrates that, when the mass rubber particular is high, this results in worse gloss and better impact properties. Ex. 9, at the same impact strength, has a better gloss than Comp. 2. This is achieved with a higher content of better cross-linked and smaller mass rubber particles.

TABLE 7

| | | Ex. 6 | Ex. 7 | Comp. 3 | Comp. 4 |
|---|---|---|---|---|---|
| Composition | | | | | |
| E-1 | wt. % | 16.5 | 16.5 | 16.5 | 16.5 |
| M-6 | wt. % | 81.25 | 0 | 0 | 0 |
| M-4 | wt. % | 0 | 81.25 | 0 | 0 |
| M-7 | wt. % | 0 | 0 | 81.25 | 0 |
| M-5 | wt. % | 0 | 0 | 0 | 81.25 |
| Acrawax C [8] | wt. % | 1 | 1 | 1 | 1 |
| Edenor NHTI [9] | wt. % | 1 | 1 | 1 | 1 |
| PDMS DC200 (50 cSt.) [10] | wt. % | 0.25 | 0.25 | 0.25 | 0.25 |
| Rubber composition | | | | | |
| mass rubber | wt. % | 6.5 | 6.3 | 6.5 | 6.7 |
| Small emulsion rubber | wt. % | 6.9 | 6.9 | 6.9 | 6.9 |
| Large emulsion rubber | wt. % | 1.7 | 1.7 | 1.7 | 1.7 |
| Total | wt. % | 15.1 | 14.9 | 15.1 | 15.2 |
| mass/total rubber | wt. % | 43 | 42 | 43 | 44 |
| Small emulsion/total rubber | wt. % | 46 | 47 | 46 | 45 |
| Large emulsion/total rubber | wt. % | 11 | 11 | 11 | 11 |
| Morphology | | | | | |
| rubber particle size (Dv) small emulsion | Um | 0.15 | 0.15 | 0.15 | 0.15 |
| large emulsion | Um | 0.34 | 0.34 | 0.34 | 0.34 |
| mass ABS | Um | 0.28 | 0.25 | 0.24 | 0.25 |
| Characterization | | | | | |
| LAR | | 1.21 | 1.22 | 1.45 | 1.47 |
| Mw | kg/mole | 163 | 160 | 156 | 163 |
| D (Mw/Mn) | | 3.6 | 3.6 | 3.5 | 3.7 |
| PBD content | wt. | 16.7 | 15.9 | 16.4 | 16.1 |
| AN content | wt. | 26.7 | 26.2 | 25.8 | 26 |
| STY content | wt. | 56.6 | 57.9 | 57.8 | 57.9 |
| AN/SAN | wt. | 32 | 31 | 31 | 31 |
| Rubber volume fraction Φ Mass | Vol. % | 7.0 | 9.8 | 7 | 9.8 |
| small emulsion | Vol. % | 8.1 | 8.9 | 8.1 | 8.9 |
| large emulsion | vol. % | 2.4 | 2.4 | 2.4 | 2.4 |
| Total | | 17.5 | 21.1 | 17.5 | 21.1 |
| mass/total rubber | vol. % | 40 | 46 | 40 | 46 |
| Small emulsion/total rubber | vol. % | 46 | 42 | 46 | 42 |
| Large emulsion/total rubber | vol. % | 14 | 12 | 14 | 12 |
| Properties | | | | | |
| MFR | 220° C./10 kg | g/10¹ | 21.2 | 15.9 | 20.8 | 16.4 |
| Izod | 2.75 J | KJ/m2 | 20.7 | 20.5 | 26.1 | 30.1 |
| gloss (bottom) | 20 ° | % | 36 | 35 | 5 | 5 |
| | 60 ° | % | 82 | 80 | 51 | 50 |
| gloss (top) | 20 ° | % | 83 | 82 | 58 | 52 |
| | 60 ° | % | 96 | 95 | 90 | 89 |

Comparison of Ex. 6 and Exp. 7 with Comp. 3 and Comp. 4, demonstrates that, at similar mass rubber particle size and content, the gloss is decreased when the LAR is too high.

TABLE 8

|  |  |  | Ex. 1 | Comp. 5 |
|---|---|---|---|---|
| Composition |  |  |  |  |
| E-1 |  | wt. % | 17 | 27.5 |
| SAN 125 [7] |  | wt. % | 0 | 70.5 |
| M-2 |  | wt. % | 80.75 | 0 |
| Acrawax C [8] |  | wt. % | 1 | 1 |
| Edenor NHTI [9] |  | wt. % | 1 | 1 |
| PDMS DC200 (50 cSt.) [10] |  | wt. % | 0.25 | 0 |
| Rubber composition |  |  |  |  |
| mass rubber |  | wt. % | 5.8 | 0 |
| Small emulsion rubber |  | wt. % | 7.0 | 11.5 |
| Large emulsion rubber |  | wt. % | 1.8 | 2.8 |
| Total |  | wt. % | 14.7 | 14.3 |
| mass/total rubber |  | wt. % | 40 | 0 |
| Small emulsion/total rubber |  | wt. % | 48 | 80 |
| Large emulsion/total rubber |  | wt. % | 12 | 20 |
| Morphology |  |  |  |  |
| rubber particle size (Dv) | Small emulsion | Um | 0.15 | 0.15 |
|  | Large emulsion | Um | 0.34 | 0.34 |
|  | Mass ABS | Um | 0.30 | — |
| Characterization |  |  |  |  |
| LAR |  |  | 1.22 | 1.22 |
| Mw |  | kg/mole | 153 | 96 |
| D (Mw/Mn) |  |  | 3.4 | 2 |
| PBD content |  | wt. | 16.5 | 16.7 |
| AN content |  | wt. | 26.3 | 29.3 |
| STY content |  | wt. | 57.2 | 54 |
| AN/SAN |  | wt. | 31 | 35 |
| Rubber volume fraction Φ | Mass | vol. % | 10.1 | 0 |
|  | Small emulsion | vol. % | 8.4 | 11.4 |
|  | Large emulsion | vol. % | 2.1 | 2 |
|  | Total | vol. % | 20.6 | 13.4 |
| mass/total rubber |  | vol. % | 49 | 0 |
| Small emulsion/total rubber |  | vol. % | 41 | 85 |
| Large emulsion/total rubber |  | vol. % | 10 | 15 |
| Properties |  |  |  |  |
| MFR | 220° C./10 kg | g/10$^1$ | 16.2 | 15.6 |
| Izod | 2.75 J | KJ/m2 | 27.6 | 29.5 |
| gloss (bottom) | 20 ° | % | 31 | 56 |
|  | 60 ° | % | 79 | 87 |
| gloss (top) | 20 ° | % | 80 | 85 |
|  | 60 ° | % | 95 | 97 |
| Yellowness index | 240° C. |  | 12.95 | 19.30 |
| Yellowness index | 280° C. |  | 15.01 | 20.06 |

A comparison of Ex. 1 with Comp. 5, demonstrates that the yellowness index of the compositions of this invention is lower due to the lower amount of small and large emulsion rubber particles.

What is claimed is:

1. A rubber-modified polymeric composition comprising: (a) a continuous matrix phase comprising an interpolymer of a monovinylidene aromatic monomer and an ethylenically unsaturated nitrile monomer; and (b) from 5 to 40 weight percent, based on the total weight of said polymeric composition, of a rubber in the form of discrete rubber particles dispersed in said matrix, wherein the dispersed rubber particles comprise:

(1) at least 33 weight percent based on the total rubber content, of a mass rubber particle component having a volume average particle diameter of from 0.15 to 0.40 micron;

(2) from 15 to 67 weight percent based on the total rubber content, of a small-particle emulsion rubber component having a volume average diameter of from 0.05 to 0.30 micron; and (3) from 0 to 35 weight percent based on the total rubber content, of a large emulsion particle rubber component having a volume average diameter of from greater than 0.30 to 2.0 microns;

wherein the rubber particles of the composition have an average light absorbance ratio of less than 1.4.

2. The composition of claim 1 wherein the monovinylidene aromatic monomer is styrene and the ethylenically unsaturated nitrile monomer is acrylonitrile.

3. The composition of claim 2 wherein no more than 16 weight percent of the total interpolymer matrix has a Mw of less than 25,000.

4. The composition of claim 1 wherein the unsaturated nitrile is from 20 to 35 percent of the interpolymer.

5. The composition of claim 1 wherein the rubber particles of (1) are produced from a star-branched rubber.

6. The composition of claim 1 wherein the rubber particles of (1) are produced from a low solution viscosity rubber having a solution viscosity (5% in styrene at 20° C.) of less than 120 cps.

7. The composition of claim 1 wherein the total rubber content is from 5 to 30 weight percent of the composition.

8. The composition of claim 1 wherein the total rubber content is from 5 to 25 weight percent of the composition.

9. The composition of claim 1 wherein the rubber particles of (1) are at least 35 weight percent of the total weight of the rubber.

10. The composition of claim 1 wherein the rubber particles of (2) are from 20 to 50 weight percent of the total weight of the rubber.

11. The composition of claim 1 wherein the rubber particles of (3) are from 10 to 35 weight percent of the total weight of the rubber.

12. The composition of claim 1 wherein the rubber particles of (1) have an average light absorbance ratio of less than 2.2.

13. The composition of claim 1 additionally comprising a low molecular additive having a surface tension of less than 30 dyne/cm according to ASTM D1331 at 25° C.

14. The composition of claim 13 wherein the low molecular weight additive comprises polydimethylsiloxane.

15. The composition of claim 13 wherein the low molecular weight additive comprises a fluorinated polymer.

* * * * *